United States Patent [19]

Russell et al.

[11] 3,884,285
[45] May 20, 1975

[54] ABRASION-RESISTANT RUBBER COMPOSITIONS

[75] Inventors: David B. Russell, Westfield, N.J.; Thomas J. Doran, Jr., Norton, Ohio

[73] Assignee: PPG Industries, Inc., Pittsburgh, Pa.

[22] Filed: Oct. 11, 1973

[21] Appl. No.: 405,725

Related U.S. Application Data

[63] Continuation-in-part of Ser. No. 187,838, Oct. 8, 1971, abandoned.

[52] U.S. Cl...... 152/330 R; 106/308 N; 260/37 SB; 260/42.16; 260/42.32; 260/42.33; 260/42.34; 260/42.44; 260/42.47; 260/42.49; 260/83.7; 260/765; 260/766
[51] Int. Cl..... B60c 5/00; C08c 11/10; C08c 11/12
[58] Field of Search.. 106/308 N; 260/37 SB, 42.16, 260/42.32, 42.33, 42.34, 765, 766, 83.7; 152/330

[56] References Cited
UNITED STATES PATENTS

| | | | |
|---|---|---|---|
| 3,213,091 | 10/1965 | Reynolds | 260/117 |
| 3,350,345 | 10/1967 | Vanderbilt et al. | 260/41.5 A |
| 3,468,751 | 9/1969 | Tesoro | 117/126 GS |
| 3,567,680 | 3/1971 | Iannicelli | 106/308 N |

*Primary Examiner*—Donald E. Czaja
*Assistant Examiner*—H. H. Fletcher
*Attorney, Agent, or Firm*—Irwin M. Stein

[57] ABSTRACT

Abrasion-resistant vulcanized rubber compositions which are also resistant to heat build-up are provided which are useful as tire treads and subtreads for vehicles, e.g., automobiles. The compounds comprise the vulcanizate of a rubber polymer, a finely-divided reinforcing siliceous pigment, and an organic coupling agent having at least one nitrogen functional group that bonds to the siliceous pigment and at least one sulfur functional group that bonds to the rubber polymer.

23 Claims, No Drawings

ABRASION-RESISTANT RUBBER COMPOSITIONS

CROSS-REFERENCE TO RELATED APPLICATIONS

This application is a continuation-in-part application of our copending application U.S. Ser. No. 187,838, filed Oct. 8, 1971, for Abrasion-Resistant Rubber Compositions, now abandoned.

DESCRIPTION OF THE INVENTION

This invention relates to improving the abrasion resistance characteristics of vulcanized rubber compositions containing finely-divided reinforcing siliceous pigments by including therein an organic coupling agent having at least one nitrogen functional group capable of bonding to the siliceous pigment and at least one sulfur functional group capable of bonding to the rubber polymer. The term "bond", as used herein, is intended to mean and include chemical and physical bonds. This invention also relates to a rubber compounding additive comprising a major amount of siliceous pigment and a minor but effective or coupling amount of the aforesaid coupling agent.

The improved vulcanized rubber compounds, which are suitable for use as tire treads and/or subtreads or in other applications where abrasion resistance and low heat build-up are desired, comprises the vulcanizate of a rubber polymer, a finely-divided reinforcing siliceous pigment and a minor but effective coupling amount of an organic coupling agent. The conventional rubbers, e.g., sulfur curable rubbers, and reinforcing siliceous pigments can be employed. The coupling agent has at least one nitrogen functional group and preferably has two and, more preferably, has five or more, nitrogen functional groups. The upper limit of such groups is that number which makes the coupling agent insoluble in the rubber formulation. The coupling agent also contains preferably a plurality of sulfur functional groups; but, only one is required. The number of nitrogen functional groups, however, depends upon the particular compound employed. For example, compounds containing isocyanate, isothiocyanate, carbodiimide, or cyclic imines show some coupling effect when only a single nitrogen functional group is present. Compounds containing primary, secondary, and tertiary amino groups, (and mixtures of such groups) however, require at least two, and preferably five or more nitrogen functional groups per molecule in order to obtain a coupling effect. The ratio of nitrogen functional groups to sulfur functional groups, however, is preferably at least about 2:1 and more preferably at least 4:1.

Thus, the organic coupling agent useful in preparing vulcanizates of improved abrasion resistance are compounds having both at least one nitrogen functional group and at least one sulfur functional group. By nitrogen functional groups is meant that the nitrogen containing group of the coupling agent compound is capable of bonding (coupling), physically and/or chemically, to the surface of the siliceous pigment. By sulfur functional group is meant that the sulfur containing group of the coupling agent is capable of bonding (coupling) physically and/or chemically (usually by reaction with the olefinic bonds in the curable rubber during vulcanization) to the rubbery polymer(s) used to prepare the vulcanizate. Thus, since the nitrogen and sulfur functional groups are in the same compound, the coupling agent serves to couple (bind together) the rubber to the siliceous pigment and provide a vulcanizate of improved physical properties, particularly abrasion resistance.

Exemplary of the preferred nitrogen functional groups are: primary, secondary and tertiary amino groups, isocyanate, thioisocyanate and carbodiimide groups. The nitrogen functional can be adjacent to carbonyl, sulfonyl, sulfinyl, thiocarbonyl, phosphoroso, and phospho groups in the organic coupling agent. Thus, polyfunctional compounds containing amide, urea, carbamate, sulfonamide, sulfanilamide, sulfimide, and the like, can be employed. Compounds in which the nitrogen is adjacent to a carbonyl or thiocarbonyl group or other electron withdrawing group can be employed but are less preferred as they are of low basicity and include, for example, amides, ureas, carbamates, and sulfonamides. The most preferred coupling agents are compounds containing polyamino or polyimino groups, which compounds can be prepared from aliphatic, cycloaliphatic, and aromatic amines or cyclic imines of from 2 to 8 carbon atoms, e.g., poly(alkyleneamines) or poly(alkyleneimines) of from 2 to 4 carbon atoms.

Suitable compounds containing useful sulfur functional groups, alternatively referred to herein as sulfur compounds or mercapto precursors, include carbon disulfide, carbonyl sulfide, thiophosgene, and sulfur chloride, such as disclosed in U.S. Pat. No. 2,208,095. The preferred sulfur compounds, are ethylene sulfide or ethylene monothiolcarbonate. These compounds can be reacted with a compound having nitrogen functional group, as described above, in the presence of other non-participating groups such as ether, ester, ketone or hydrocarbon groups to yield products (coupling agents) containing both nitrogens and sulfur functional groups. For example, polyamines, polyimines, amino acids, polyproteins, amino sugars, deacetylated chitin, gelatin, and the like, can be mercapto-ethylated as taught by Reynolds, U.S. Pat. No. 3,213,091. Mercapto and disulfide functional groups can also be introduced into the nitrogen containing compound by displacement of a halogen, e.g., chlorine, or other suitable displaceable group. For example, the reaction product of ethylene dichloride and ammonia can be reacted with a hydrosulfide or polysulfide.

The preferred coupling agents encompassed herein are prepared from polyethyleneimines and a sulfur compound, such as ethylene sulfide or ethylene monothiolcarbonate. The polyethyleneimines are highly branched polyamines composed of repeating units that have two carbons per nitrogen. These repeating units contain amino nitrogens in a random distribution and in the approximate ratio of one primary amino nitrogen/two secondary amino nitrogens/one tertiary nitrogen. The aforesaid amino distribution gives rise to what is believed to be a molecule with many branched segments with the tertiary amino nitrogens being the branching sites and the primary amino nitrogens being the terminal groups of each segment. The primary and secondary amino nitrogens comprise reaction sites for reaction with the aforementioned sulfur compounds. Suitable polyethlyenimines are available from Dow Chemical Company or Alcolac Chemical Company in various molecular weight ranges. The molecular weights can range widely, e.g., from 190 to 120,000 number average molecular weight. Particularly useful polyethyleneimines range from about 600 to about 1,800 average molecular weight, e.g., 1,200. When reacted with a cyclic sulfide, such as ethylene sulfide, pendant mercaptoethylated groups –(CH₂CH₂SH) are believed to be attached to the polyethyleneimine backbone so that the sulfur-containing moieties are available for reaction with the rubber to be vulcanized. While some sulfide and polysulfide linkages may be formed by secondary reactions, the product is believed to have a majority of mercapto functional groups.

In addition to polyethyleneimine, other polyimines or polyamines can be employed such as, for example, the polymers derived from propyleneimine, 1,2-butyleneimine, 2,3-butyleneimine, 2-methyl propyleneimine; alkylether-substituted imines, such as 3-methoxypropyleneimine, 1,3-dibutoxypropyleneimine, 1-methyl-1,4-diethoxybutyleneimine-2,3; 1-ethylene gem diether (propyleneimine); unsaturated polyalkylene amines such as polyvinlyamine, and polyallylamine; polycycloalkyleneamines such as prepared by the reduction of polyvinyl pyridine; polyaryleneamines, such as polyphenyleneamine and polymethylene-polyphenylamine; polyglycolamines, and copolymers prepared from ethylene oxide and ethyleneimine or ethylene sulfide and ethyleneimine; and heterocyclic polyamines such as derived from 2-vinyl pyridine, 2-methyl, 5-vinyl pyridine, and copolymers of 2-vinyl and 2-methyl, 5-vinyl pyridines. Exemplary of the preferred amines are those illustrated by U.S. Pat. Nos. 3,335,116 and 3,579,488 (which are incorporated by reference in their entirety) and polyoxyalkyleneimines such as polyoxypropylenediimine. Suitable polyamides can be prepared by condensation of the diamine with a dibasic acid; by self-condensation of an amino acid; or, by a combination of both methods. Suitable materials which can be employed to make the polyamides are exemplified by ethylenediamine and sebacic acid, tetramethylenediamine and adipic acid, pentamethylenediamine and malonic acid, pentamethylenediamine and pimelic acid, and hexamethylenediamine and adipic acid. Other suitable materials include amino acids, polyproteins, amino sugars, deacetylated chitin and gelatin.

In addition to coupling agents made from the aforementioned cyclic sulfides, which results in principally mercapto functional groups, coupling agents can be employed which contain other groups capable of providing a sulfur functional group that will bond with the rubber polymer, i.e., react with the olefinic linkages in the rubber during vulcanization of the vulcanizable rubber composition. For example, compounds containing the following sulfur functional groups can be employed:

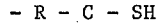

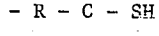

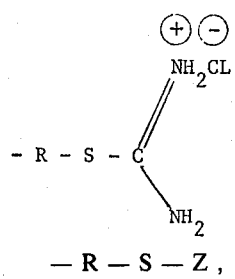

— R — S — Z, wherein Z is chlorine or bromine; R is a bivalent connecting group to the segment of the compound containing the nitrogen group which, in some cases, can be a chemical bond but generally will be a hydrocarbon chain or ring group and R' is hydrogen, alkyl, aryl, cycloalkyl, aralkyl, alkaryl, or acyl group or a member of these groups bearing substituents such as one of the halogens. Compounds containing these groups can easily be prepared by one having ordinary skill in the art.

Suitable coupling agent compounds, e.g., polymeric-type compounds, can contain alkyl or aryl backbones such as, for example, a polyethylene, a polypropylene, or a polyphenylene backbone; backbones that contain ether linkages such as found in polytetramethylene glycol, polyoxypropylene, or polyoxyethylene polymers; ester linkages such as found in polybutylene adipate and polybutylene azelate; or other groups mentioned herein. The aforementioned polymeric compounds can be made by methods well documented in the literature.

Other suitable coupling agent compounds include the randon or block copolymers that are the reaction products of, for example, ethylenimine and ethylene sulfide; ureas, such as ethylene-urea resins, and ethylene sulfide; amides, such as polyepsilon-caprolactam, and ethylene monothiocarbonate, and hexamethylenediamine adipic acid or sebacic acid condensates and ethylene sulfide; and sulfonamides, such as benzenesulfonamide-formaldehyde resins, and ethylene monothiocarbonate, sulfonamide-modified urea-formaldehyde polycondensates and ethylene sulfide; thioureas, such as methylene thiourea polycondensates and thiourea-formaldehyde resins, reacted with a sulfur compound, e.g., ethylene sulfide; isocyanates, such as polyarylene polyisocyanate (PAPI), and tetramethylene dimercaptan; isocyanato phenyl sulfenyl chloride; bis-(isocyanato phenyl) disulfide; isothiocyanates, such as bis-1-(isothiocyanato phenyl) polysulfide or mercaptoalkylated polyethylene polyisocyanate; carbodiimides, such as bis-(chlorosulfenyl phenyl) carbodiimide or bis-(dithiocarboxy phenyl) carbodiimide; and copolymers of alkylenimines and cyclic sulfides containing cyclic imines in the produce such as those described in U.S. Pat. No. 3,335,116 and 3,579,488. Preferred coupling agent compounds include: the reaction product of polyethylenimine and ethylene sulfide, the reaction product of polyethylene polyamine and ethylene monothiocarbonate, the condensation product of ammonia and ethylene dichloride which is reacted further with sodium hydrosulfide, the copolymer of 2-vinyl pyridine and 2-vinyl-5-mercaptomethyl pyridine, the condensation product of aniline and formaldehyde which is reacted further with ethylene sulfide, the reaction product of polybutylenimine and ethylene monothiocarbonate, and the reaction product of pentaethylene hexamine and 11-mercaptoundecanoic acid.

As indicated previously, the chemical literature provides one skilled in the art with the techniques required to prepare the coupling agents useful in the present invention. Exemplary of methods useful, for the preparation of isocyanato, isothiocyanato and carbodi-imide containing compounds can be found in (a) "High Molecular Weight Compounds", by G. Oertel et al., *Rubber Age*, page 61, November, 1969; (b) *Organic Chemistry of Bivalent Sulfur*, by E. E. Reid, Vol. VI, p.64, Chemical Publishing Co., New York, 1966; and (c) *The Organic Chemistry of Nitrogen*, by N. V. Sidgwick, p.433, Clarendon Press, Oxford, England, 1966.

In the Oertel article, the synthesis of sulfenyl chloride isocyanates having the general formula $Cl—S—R_1—NCO$, is described. Particularly, 4-isocyanatophenyl sulfenyl chloride was synthesized by the chlorination of bis(4-aminophenyl) disulfide. This compound has both an isocyanate and a sulfenyl chloride group, i.e., nitrogen and sulfur functional groups, in the compound. The Reid publication describes the preparation of isothiocyanates, either aliphatic or aromatic, from primary amines and thiophosgene in accordance with the following equation,

$$R_2NH_2 + SCCl_2 \rightarrow R_2NCS$$

The Sidgwick publication describes the preparation of carbodi-imides by the removal of $H_2S$ from disubstituted thioureas in accordance with the following equation,

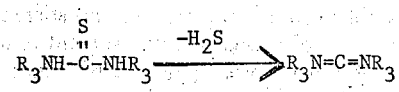

Thus, from a diamine having a disulfide linkage, such as

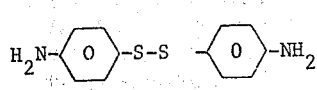

an isothiocyanate-terminated compound can be prepared by the method of Reid (above) and carbodi-imide terminated compounds prepared by the method of Sidgwich.

Any of the commonly employed siliceous pigments used in rubber compounding applications can be employed in this invention, including pyrogenic and precipitated siliceous pigments (silica).

The siliceous pigments preferably employed in this invention are those obtained by the acidification of a soluble silicate, e.g., sodium silicate, such as silica produced according to the method described in U.S. Pat. No. 2,940,830. These pigments have an $SiO_2$ content of at least 50 percent and usually greater than 80 percent by weight on an anhydrous basis. The siliceous pigment should have an ultimate particle size in a range of 50 to 10,000 angstroms, preferably between 50 and 400 angstroms and, more preferably, between 100 and 300 angstroms. The BET surface area of the pigment, as measured using nitrogen gas, is preferably in the range of 40 to 600, usually 50 to 300 square meters per gram. The BET method of measuring surface area is described in the *Journal of the American Chemical Society*, Vol. 60, page 304 (1930). A typical commercial form of such reinforcing siliceous pigment is manufactured and sold by PPG Industries, Incorporated, under the designation Hi-Sil 233.

The rubber compound used to prepare the compositions of the present invention can be any of the commonly employed vulcanizable natural or synthetic type rubbers such as silicone, chloroprene, polybutadiene, polyisoprene, EPDM, butadiene, and styrene-butadiene rubbers. For use in tire treads and base stocks for pneumatic tires, the rubber polymer is preferably of the conventional sulfur curable types such as styrene-butadiene rubber, butadiene rubber, EPDM, and natural rubber.

The rubber composition can contain any of the various compounding additives conventionally included in vulcanizable rubber compositions such as accelerators (e.g., guanidines), activators (e.g., zinc oxide), oil extenders (e.g., Sundex 53 — manufactured and sold by Sun Oil Company), curatives (e.g., sulfur), etc.

The coupling agent can be added in any of the several stages of rubber compounding. In one embodiment, the coupling agent can be mixed with the siliceous pigment prior to incorporating the pigment into the rubber batch. Such mixing can be accomplished by mixing the coupling agent and pigment at a temperature between about 0°C. and about 80°C. in a solvent such as water, benzene, xylene, or other suitable nonreactive (inert) solvent for the coupling agent and pigment for between about 1 and 120 minutes until the coupling agent is adsorbed on the siliceous pigment. In this manner, the coupling agents which are often highly viscous materials can be more rapidly incorporated into the rubber batch and any tendency of the rubber to become overheated or scorched, obviated or minimized.

The coupling agent can be added to the rubber batch separately but simultaneously with the siliceous pigment and other additives during the Banbury mixing or on the mill and the coupling agent can be in any one of several forms when it is mixed with the rubber or siliceous pigment. For example, it can be in the vapor state. Alternatively, it can be added in a substantially pure state, or as a liquid or solid dissolved in an organic solvent, or dissolved or suspended in water, or the processing oil used in the rubber compound. The coupling agent can also be masterbatched with a portion of the silica and rubber used to prepare the rubber composition and then mixed with the rest of the rubber compounding ingredients. In addition, the coupling agents can be made in situ. For example, ethylene monothiolcarbonate or polyethylenimine precursor reactants can be adsorbed on the siliceous pigment and the other ingredients added while mixing the rubber ingredients so that the rubber polymer serves as a solvent. Alternatively, the coupling agent compound precursors can be added while mixing the rubber ingredients.

Preferably the coupling agent is mixed with the siliceous pigment and the rubber prior to incorporating any of the polar additives, particularly the soaps, metal oxides (especially zinc oxide), amines, glycols, and accelerators (especially guanidine) into the rubber batch.

Unless otherwise indicated, the hereinafter-described compounding ingredients will be stated as parts by weight. Furthermore, the formulations will be based on 100 parts of rubber. Typically, the rubber composition used in the tires of the present invention will comprise 100 parts of rubber, such as a styrene-butadiene rubber; 5 to 100 parts of silica (preferably 40 to 90 parts), such as Hi-Sil 233 (Trademark of PPG Industries, Inc.) reinforcing siliceous pigment; and 0.1 to 15 parts of coupling agent (preferably between about 1 and about 8 parts), such as mercaptoethylated polyethylenimine. The amount of coupling agent employed in the rubber composition is dependent upon the amount of siliceous pigment used, the number of sulfur and nitrogen functional groups present in the coupling agent as well as the other compounding ingredients used to prepare the rubber compositions. The particular amount used is not critical since only that amount needed to effectively bond or couple the siliceous pigment to the rubber used, i.e., a coupling amount, is required. The aforementioned typical quantities are guidelines to the person skilled in the art. The most preferred amounts of coupling agent for any particular formulation however, can be determined by anyone having ordinary skill in the art by preparing vulcanizates at various selected levels of coupling agent and testing physically the vulcanizates. Thus the invention is not in the relative proportions of the compounding ingredients; but, in the coupling agent. Conventional sulfur or peroxide curatives can also be employed. The sulfur curative can include 0.5 to 3 parts sulfur, 2 to 5 parts zinc oxide, and 0.5 to 2 parts accelerator. A peroxide curative can include 1 to 4 parts dicumyl peroxide, such as Dicup 40C (Trademark of Hercules Powder Company, Inc.).

When the coupling agent is added to the vulcanizable rubber composition premixed with the siliceous pigment, i.e., as a rubber compounding additive, the pigment-coupling agent typically comprises a major amount of siliceous pigment and a minor amount of coupling agent. The minor amount of coupling agent is, however, sufficient to provide coupling between the pigment and the vulcanizable rubbery polymer when the pigment-coupling agent composition is incorporated into a vulcanizable rubber composition, i.e., the resulting vulcanizate has improved abrasion resistance as compared to a similar vulcanizate prepared without the coupling agent. Typically, the additive will comprise from 5 to 60 parts more typically from 10 to 40 parts by weight, of siliceous pigment, per part of coupling agent.

The following Examples are illustrative of the invention and preferred embodiments. All parts and percentages in said Examples are by weight unless otherwise indicated.

EXAMPLE 1

Into a 5-liter round-bottomed 3-neck flask equipped with mechanical stirrer, nitrogen gas inlet, dropping funnel and reflux condenser with a gas exit line funneled into a flask of xylene to prevent air contamination, was added a solution of 65 grams of polyethylenimine having an average molecular weight of 1200 and a minimum weight percent assay of 99 percent $C_2H_5N$ (Dow Chemical PEI-12) in 3000 milliliters of reagent grade benzene. The dropping funnel was charged with a solution of 45 grams of ethylene sulfide in 200 milliliters of benzene. The entire system was purged of oxygen with a rapid stream of nitrogen and then the ethylene sulfide solution was added dropwise over about an hour to the stirred reaction mixture at 25°C. The contents were stirred for 5 to 7 days during which time a sticky off-white precipitate formed. The solution was decanted off and the precipitate was discarded because it was not homogeneous. The solvent was removed from the solution under 30 to 50 millimeters of mercury pressure on a rotary evaporator in the flask heated in a water bath at 35°–40°C. The solution was kept on the evaporator for 12 hours and the product remaining in the flask transferred to a wide-mouthed bottle and dried in a vacuum oven at 35°C. at 20 milliliters of mercury pressure for at least 24 hours. The product weighed 65 grams and was found to contain 13.6 percent sulfur.

EXAMPLE 2

To a 1-liter, 3-necked round-bottomed flask equipped with dropping funnel, mechanical stirrer, nitrogen inlet and reflux condenser with a dry-ice condenser above it, was added a solution of 12 grams of polyethylenimine having an average molecular weight of 1200 and a minimum weight percent assay of 99 percent $C_2H_5N$ (Dow Chemical PEI-12) in 600 milliliters of benzene. The dropping funnel was charged with a solution of 2, 4, 6 or 8 grams, respectively, of ethylene sulfide in 55 milliliters of benzene. The system was purged with nitrogen and then was placed under a slight positive pressure by venting through a tube immersed in a flask of toluene. The solution in the dropping funnel was added dropwise to the stirred reaction mixture over a ½ hour period. The reaction mixture was heated and then boiled under reflux for 1 hour at a temperature of from 75°–80°C. The mixture was allowed to cool to room temperature and stirred for approximately 16 hours and then the solvent removed in a rotary evaporator pursuant to the procedure of Example 1.

In order to incorporate the mercaptoethylated polyethylenimine coupling agent into the rubber composition by the preferred method, a rubber additive is prepared by pre-mixing the coupling agent with the siliceous pigment in order to attach the two by physical or chemical bond. The following Example is illustrative of a method to prepare the rubber compounding additive.

EXAMPLE 3

The product of Example 1 was mixed with the silica pigment in the following described manner.

Into a 3-liter, 3-necked flask equipped with dropping funnel, mechanical stirrer and reflux condenser with a Dean-Stark water trap were placed 100 grams of Hi-Sil 233 precipitated silica and 1,000 milliliters of benzene. The mixture was stirred and heated under reflux temperature of between 75° and 80°C. until about 3 milliliters of water had collected in the trap. The mixture was allowed to cool to room temperature and the aliquot of benzene solution of mercaptoethylated polyethylenimine prepared in Example 1 added dropwise with stirring in amounts sufficient to give the desired concentration on the Hi-Sil pigment. The mixture was stirred for from 1 to 2 hours, allowed to settle and then filtered. The treated silica was then dried in a vacuum oven at 35°C. for 24 hours.

EXAMPLE 4

The following rubber compounds were prepared by mixing the ingredients shown in Table 1 (other than the ingredients marked by an asterisk, which were added to the rubber mix on an open rubber mill) in a Banbury for about 5 minutes at a temperature of between 300 and 320°F.

TABLE I

| Rubber Compounds | 4-A | 4-B | 4-C | 4-D |
| --- | --- | --- | --- | --- |
| Ingredients (parts by weight) | | | | |
| SBR 1502 (cold polymerized butadiene-styrene rubber) | 98 | 98 | 98 | 98 |
| N-285 Black[1] | — | — | — | 60 |
| Hi-Sil[2] 233 | 60 | 60 | 60 | — |
| S-300[1] Black[3] | 1 | 1 | 1 | 1 |
| Sundex 790[4] | 10 | 10 | 10 | 10 |
| Stearic Acid | 2 | 2 | 2 | 2 |
| Phenyl-beta-naphthylamine | 1 | 1 | 1 | 1 |
| Flexamine G[5] | 1 | 1 | 1 | 1 |
| Composition of Example 1 | — | 2 | 4 | — |
| 2,2'-Benzothiazole Disulfide* | 1.5 | 1.2 | 1.5 | 0.8 |
| Di-ortho-tolylguanidine* | 1.5 | 1.2 | 1.5 | 0.3 |
| Sulfur* | 2.75 | 2.75 | 2.75 | 1.85 |
| ZnO Masterbatch (⅓ butadiene-styrene rubber and ⅔ zinc oxide)* | 6.0 | 6.0 | 6.0 | 6.0 |

[1]Standard ASTM designation.
[2]Trademark, PPG Industries, Inc. A precipitated, hydrated silica having an ultimate particle size of 200 angstroms, a BET surface area of approximately 150 square meters per gram, and containing $SiO_2$ - 87.5%, CaO - 0.75%, $R_2O_3$ - 0.95%, NaCl - 1.6%, a weight loss at 105°C. of 6.3% and the balance is bound water.
[3]The carbon black was added to the silica-filled rubber for purposes of coloring the rubber.
[4]Trademark, Sun Oil Company for aromatic processing oil.
[5]Trademark, United States Rubber Company. A physical mixture containing 65% of a complex diarylamine ketone reaction product and 35% of a commercial N,N'-diphenyl-p-phenylene diamine.
*Added on open mill and mixed for about 10 minutes at 180°F.

The rubber compounds in Table I were then subjected to various physical tests and the results are reported in the following Table II:

TABLE II

| Compound | 90% Cure (Min.) | 212°F. Viscosity[1] ML 4' | Heat Build-up[2] | Permanent Set[2] | Pico Abrasion Index[3] | Road Wear Index[4] |
| --- | --- | --- | --- | --- | --- | --- |
| 4-A | 34 | 131 | 80 | 16 | 80 | 66 |
| 4-B | 14.5 | 104 | 38 | 5 | 88 | 94 |
| 4-C | 21 | 102 | 44 | 5.6 | 89 | 104 |
| 4-D | 27 | 58 | 57 | 7.3 | 166 | 100 |

[1]Tested according to ASTM D-1646.
[2]Tested according to ASTM D-623 method A.
[3]Tested according to ASTM D-2228-63T.
[4]Tested by Three T Fleet, Inc., substantially as described in U.S. Pat. No. 3,397,583. The results are accurate to within 5 points.

In determining the Road Wear Index, a tread band or portion was prepared of each of the Rubber Compounds 4-A through 4-D. The tread bands were applied to a new tire carcass. The tire cure included preheating the rubber compounds for 35 minutes at 210°F., then placing them in a mold for 17 minutes at 330°F. The tire was mounted on an automobile which was driven at 60–70 miles per hour on a hard-surfaced road for 4,025 miles. The road traveled was flat and included a combination of curved portions and straight portions. This test is designed to effect a combination of slow and fast wear. The amount of tread lost during the test is determined and the Road Wear Index shows a comparison of the wear of each of the tread bands using the carbon black filled compound 4-D as an arbitrary standard of reference and given a rating of 100. The load was 1160 pounds on each tire. The tires were inflated to 28 pounds per square inch gauge.

The data reported in Table II demonstrate that the compositions of the present invention (4B and 4C) are both abrasion-resistant and resistant to heat build-up and thus useful for belting, hose, tires, and other applications. These characteristics render the compositions particularly useful for tire treads and sub-treads. For example, compositions 4-B and 4-C exhibit considerably lower heat build-up than the Control 4-A or the carbon black filled composition, 4-D. Thus, these compositions would be advantageous for use as tire treads or tire sub-treads. In addition, compounds 4-B and 4-C also exhibit a desirable high Road Wear Index particularly the latter compound which is equal or superior to the carbon black filled compound 4-D and considerably superior to the Control compound 4-A containing silica as the reinforcing pigment. Thus, with the aid of the coupling agents of the invention, rubber compounds can be prepared employing silica as the reinforcing pigment which are equal to or superior to compounds containing carbon black as the reinforcing pigment.

EXAMPLE 5

Other rubber compositions were prepared employing the mercapto-ethylated polyethylenimines prepared in Example 2 and the ratio of ethylene sulfide to polyethylenimine was 2, 4, 6 and 8 grams per 12 grams of polyethylenimine and the resultant product contained from 3.8 percent sulfur to 14.1 percent sulfur. The coupling agents were incorporated into the rubber compounds at a concentration of from 0.6 parts per hundred to 4 parts per hundred and improved properties were noted in each case. A compound containing a single functional sulfur group but polyfunctional nitrogen groups, i.e., 11-mercaptoundecanoyl tetraethylenepentamine of the formula:

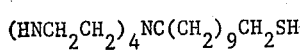

was less effective.

EXAMPLE 6

Into a 5 liter, 3-necked flask equipped with mechanical stirrer, nitrogen gas purge, dropping funnel and Dean-Stark trap with reflux condenser was placed a previously prepared solution of 100 grams of polyethlenimine having an average molecular weight of 1200 (Dow Chemical PEI-12) in 2500 ml. of benzene. An additional 1000 ml. of benzene was added to the flask and the mixture heated under reflux until the condensate collected in the trap no longer contained water. To the solution in the flask was then added dropwise over 3 hours a solution of 21 grams of ethylene sulfide in 200 ml. of benzene and then subsequently over 4 hours a solution of 15 grams of ethylene sulfide in 150 ml. of benzene. The reaction mixture was heated for a total of 20 hours. No insoluble by-product was observed in the flask. The solvent in the reaction mixture was removed on a rotary evaporator at 35°–40°C. and about 30 mm of mercury to yield a slightly cloudy, colorless viscous residue weighing 127 grams. This product was found to contain about 13.5 percent mercaptan (SH) by spectrophotometric analysis and is designated compound 6A.

The above procedure was repeated using 100 grams of polyethylenimine and 40 grams of ethylene sulfide. This product was found to contain 15.9 percent mercaptan (SH) and is designated compound 6B.

The above procedure was repeated further with 100 grams of polyethyleneimine and 12 grams of ethylene sulfide. This product was found to contain 4.8 percent mercaptan (SH) and is designated compound 6C.

The mercaptoethylated compounds of this example 6 were incorporated into a rubber composition prepared by mixing the ingredients of Table III (other than those identified by an asterisk, which were added to the rubber mix on an open rubber mill) in a Banbury. A carbon black control was prepared also and designated compound 6D.

TABLE III

| Rubber Compounds | 6-A | 6-B | 6-C | 6-D |
| --- | --- | --- | --- | --- |
| Ingredients (parts by weight) | | | | |
| SBR 1502 (cold polymerized butadiene-styrene rubber) | 98 | 98 | 98 | 98 |
| N-285 Black[1] | — | — | — | 60 |
| Hi-Sil 233[1] | 60 | 60 | 60 | — |
| S-300 Black[1] | 1 | 1 | 1 | 1 |
| Sundex 790[1] | 10 | 10 | 10 | 10 |
| Stearic Acid | 2 | 2 | 2 | 2 |
| Age Rite Resin D[2] | 1 | 1 | 1 | 1 |
| Flexamine[1] | 1 | 1 | 1 | 1 |
| Composition of Example[6] | 2.4 | 2.4 | 2.4 | — |
| Santocure NS[3]* | 1.4 | 1.4 | 1.4 | 1.1 |
| Sulfur* | 2.2 | 2.2 | 2.2 | 1.85 |
| ZnO Masterbatch (⅓ butadiene-styrene rubber and ⅔ zinc oxide)* | 6.0 | 6.0 | 6.0 | 6.0 |
| PVI*[4] | | | | |

[1]See Table I
[2]Polymerized 1,2 - Dihydro - 2,2,4 Trimethylquinoline.
[3]N-tertiarybutyl-2-benzothiazolesulphenamide
[4]N-Cyclohexylthiophthalimide
*Added on open mill and mixed for about 10 minutes at 180°F.

The rubber compounds of Table III were cured and tested physically. The results are tabulated in Table IV.

TABLE IV

| Compound Reference | 90% Cure, Min. | Tensile, psi 20' at 300°F. | 300% Modulus, psi 20' at 300°F. | Pico Abrasion Index 45' at 300°F. | Road Wear Index[1] |
| --- | --- | --- | --- | --- | --- |
| 6A | 19.5 | 3710 | 1250 | 80 | 80.5 |
| 6B | 22.0 | 3640 | 1080 | 80 | 83.4 |
| 6C | 20.0 | 3710 | 960 | 77 | 76.8 |
| 6D | 33.5 | 3550 | 1860 | 163 | 100 |

[1]See Table II; Tire Cure: Preheat to 200°F in mold, cured 25' at 335°F. Load on tires - 1200–1250 pounds.

The date of Table IV show that the coupling agent of this invention, for this rubber formulation, improved abrasion resistance, although not to the degree obtained with carbon black. The data also show that there is no significant difference in road wear index for mercaptoethylated polyethleneimines of varying mercaptan (SH) content.

EXAMPLE 7

Into a 3 liter, 3-necked flask equipped with mechanical stirrer, addition funnel and a system for purging with nitrogen was placed a previously prepared solution of 65 grams of polyethyleneimine having an average molecular weight of 1200 (Dow Chemical PEI-12) in 1500 milliliter of benzene. An additional 500 milliliter of benzene was added. A solution of 45 grams of ethylene sulfide in 200 milliliter of benzene was placed in the addition funnel. The system was purged thoroughly with nitrogen and then kept under a slight positive pressure of nitrogen. The ethylene sulfide solution was added drop-wise over a period of two hours and the reaction mixture stirred for a week during which time an insoluble off-white solid formed on the walls of the flask. The benzene solution was decanted into a 3 liter flask and the benzene removed on a rotary evaporator at about 20 mm of mercury and 35°–45°C. The cloudy, waxy semi-solid product weighed 62 grams.

The above procedure was repeated 5 times and the products combined to yield a product having a mercaptan content of about 13.2 percent.

The mercaptoethylated compound of this example 7 was incorporated into a rubber composition prepared by mixing the ingredients of Table V (other than those identified by an asterisk, which were added to the rubber mix on an open rubber mill) in a Banbury. For comparison, formulations were prepared using carbon black and silica without the coupling agent and using polyethylenimine and gamma-mercaptopropyltrimethoxysilane as the coupling agent.

The rubber compounds of Table V were cured and the vulcanizates tested physically. The results are tabulated in Table VI.

The data of Table VI show that the coupling agent of the present invention (compound 7B) improves abrasion resistance as compared to the silica control (compound 7A); although not to the extent found with the carbon black control (compound 7D) or gamma-mercaptopropyltrimethoxysilane (compound 7C). The data further show that the compound containing the polyethylenimine (compound 7E) was no better than the silica control (compound 7A).

EXAMPLE 8

Rubber compositions were prepared using as the coupling agent for the siliceous pigment gamma-mercaptopropyltrimethoxysilane (A) and gamma-aminopropyltriethoxysilane (B) and compared to a composition prepared without a coupling agent. Formulations are listed in Table VII and physical test results in Table VIII.

TABLE VII

| Rubber Compounds | 8-A | 8-B | 8-C |
|---|---|---|---|
| Ingredients (parts by weight) | | | |
| SBR 1502 (cold polymerized butadiene-styrene rubber) | 98 | 98 | 98 |
| Hi-Sil 233[1] | 60 | 60 | 60 |
| S-300 Black[1] | 1 | 1 | 1 |
| Sundex 790[1] | 10 | 10 | 10 |
| Stearic Acid | 2 | 2 | 2 |
| Phenyl-beta-napthylamine | 1 | 1 | 1 |
| Flexamine[1] | 1 | 1 | 1 |
| Compound A[2] | 1.5 | — | — |
| Compound B[3] | — | 1.4 | — |
| Control Composition | — | — | — |
| 2,2'-Benzothiazole Disulfide* | 1.5 | 1.5 | 1.5 |
| Di-ortho-tolylguanidine* | 1.5 | 1.5 | 1.5 |
| Sulfur* | 2.75 | 2.75 | 2.75 |
| ZnO Masterbatch (⅓ butadiene-styrene rubber and ⅔ zinc oxide)* | 6.0 | 6.0 | 6.0 |

[1]See Table I.
[2]Gamma-mercaptopropyltrimethoxysilane.
[3]Gamma-aminopropyltriethoxysilane.
*Added on open mill and mixed for about 10 minutes at 180°F.

TABLE V

| Rubber Compounds | 7-A | 7-B | 7-C | 7-D | 7-E |
|---|---|---|---|---|---|
| Ingredients (parts by weight) | | | | | |
| SBR 1502 (cold polymerized butadiene-styrene rubber) | 98 | 98 | 98 | 98 | 98 |
| N-285 Black[1] | — | — | — | 60 | — |
| Hi-Sil 233[1] | 60 | 60 | 60 | — | 60 |
| S-300 Black[1] | 1 | 1 | 1 | 1 | 1 |
| Sundex 790[1] | 10 | 10 | 10 | 10 | 10 |
| Stearic Acid | 2 | 2 | 2 | 2 | 2 |
| Age Rite Resin D[2] | 1 | 1 | 1 | 1 | 1 |
| Flexamine[1] | 1 | 1 | 1 | 1 | 1 |
| Composition of Example 7 | — | 2.5 | — | — | — |
| Polyethylenimine (PEI-12) | — | — | — | — | 2.5 |
| Gamma-mercaptopropyltrimethoxysilane | — | — | 1.2 | — | — |
| 2,2'-Benzothiazole Disulfide* | 1.5 | 1.2 | 1.2 | 0.8 | 1.2 |
| Di-ortho-tolylguanidine* | 1.5 | 1.2 | 1.2 | 0.3 | 1.2 |
| Sulfur* | 2.2 | 2.2 | 2.2 | 1.85 | 2.2 |
| ZnO Masterbatch (⅓ butadiene-styrene rubber and ⅔ zinc oxide)* | 6.0 | 6.0 | 6.0 | 6.0 | 6.0 |

[1]See Table I
[2]Polymerized 1,2-Dihydro-2,2,4 Trimethylquinoline
*Added on open mill and mixed for about 10 minutes at 180°F.

TABLE VI

| Compound Reference | 90% Cure Min | Tensite, psi 20' at 300°F. | 300% Modulus, psi 20' at 300°F. | Pico abrasion Index 45' at 300°F. | Road Wear Index[1] |
|---|---|---|---|---|---|
| 7A | 35.0 | 3320 | 620 | 65 | 71 |
| 7B | 12.5 | 3500 | 1380 | 81 | 82 |
| 7C | 22.0 | 3910 | 1340 | 92 | 97 |
| 7D | 37.0 | 3440 | 2110 | 158 | 100 |
| 7E | 13.0 | 3260 | 770 | 68 | 73 |

[1]See Table II; Tire Cure: Preheat 35 minutes at 200°F. in mold, cured 28 minutes at 320°F. Load on tires 1180 pounds, Inflation 32 psi, Speeds - 70 mph.

TABLE VIII

| Compound Reference | Pico Abrasion Index | Road Wear Index[1] |
|---|---|---|
| 8A | 111 | 156 |
| 8B | 82 | 104 |
| 8C | 84 | 100 |

[1]See Table II, Tire Cure: Preheat 15 minutes at 200°F. in mold; Cure 22 minutes at 320°F.; Loan on Tires - 1130 pounds; Inflation 32 psi; Speed 60 mph.

The data of Table VIII show that the aminopropyltriethoxysilane was no better, as regarding abrasion resistance, than the silica control, which was arbitrarily taken at a standard of 100.

While there are above described a number of specific embodiments of the present invention, it is obviously possible to produce other embodiments in various equivalent modifications thereof without departing from the spirit of the invention.

Having set forth the general nature and specific embodiments of the present invention, what is claimed is particularly pointed out in the appended claims.

1. A vulcanized rubber composition comprising the vulcanizate of a vulcanizable rubber polymer, from 5 to 100 parts, per 100 parts of rubber polymer, of finely-divided reinforcing siliceous pigment, and between 0.1 and 15 parts, per 100 parts of rubber polymer of an organic coupling agent the functional groups of which consist essentially of at least one sulfur functional group capable of bonding to the rubber polymer and at least one nitrogen functional group capable of bonding to the siliceous pigment provided that when the nitrogen functional group is amino the coupling agent has at least two such groups.

2. The composition of claim 1 wherein the nitrogen functional group is selected from the group consisting of isocyanato, isothiocyanato, carbodi-imido and cyclic imino.

3. The composition of claim 1 wherein the nitrogen functional group is amino or imino group.

4. The composition of claim 3 wherein the sulfur functional group is the mercapto group.

5. The composition of claim 3 wherein the nitrogen functional group is primary, secondary, or tertiary amino groups and mixtures of such groups.

6. The composition of claim 5 wherein the coupling agent contains at least 5 nitrogen functional groups per molecule.

7. The composition of claim 1 wherein the ratio of nitrogen functional groups to sulfur functional groups is at least 2:1.

8. The composition of claim 1 wherein the coupling agent is a mercaptoalkylated poly(alkyleneimine).

9. The composition of claim 8 wherein the coupling agent is mercaptoethylated polyethyleneimine.

10. The composition of claim 1 wherein the rubber polymer is styrene-butadiene rubber.

11. A vulcanized rubber composition comprising the vulcanizate of a vulcanizable rubber polymer, from about 40 to about 90 parts of finely-divided reinforcing siliceous pigment and from about 0.1 to about 15 parts of an organic coupling agent the functional groups of which consist essentially of at least one sulfur functional group capable of bonding to the rubber polymer and at least one nitrogen functional group capable of bonding to the siliceous pigment, said amounts being based on 100 parts of rubber polymer provided that when the nitrogen functional group is amino the coupling agent has at least two such groups.

12. The composition of claim 11 wherein the ratio of nitrogen functional groups to sulfur functional groups is at least 2:1.

13. The composition of claim 11 wherein the coupling agent is a mercaptoalkylated poly(alkyleneimine).

14. The composition of claim 11 wherein the coupling agent is mercaptoethylated polyethyleneimine.

15. The composition of claim 14 wherein the rubber polymer is styrene-butadiene rubber.

16. The composition of claim 11 wherein the coupling agent is present in amounts of from 1 to 8 parts per 100 parts of rubber polymer and the nitrogen functional group is amino or imino.

17. The composition of claim 16 wherein the nitrogen functional group is primary, secondary, or tertiary amino groups and mixtures of such groups.

18. A rubber tire having as the tread, subtread or tread and subtread thereof a vulcanizate of a composition comprising a vulcanizable rubber polymer, from 5 to 100 parts of finely-divided reinforcing siliceous pigment and from about 0.1 to about 15 parts of an organic coupling agent the functional groups of which consist essentially of at least one sulfur functional group capable of bonding to the rubber polymer and at least one nitrogen functional group capable of bonding to the siliceous pigment, said amounts being based on 100 parts of rubber polymer, provided that when the nitrogen functional group is amino the coupling agent has at least two such groups.

19. The rubber tire of claim 18 wherein the nitrogen functional group is primary, secondary, or tertiary amino groups and mixtures of such groups.

20. The rubber tire of claim 19 wherein the coupling agent contains at least 5 nitrogen functional groups per molecule.

21. The rubber tire of claim 18 wherein the ratio of nitrogen functional groups to sulfur functional groups is at least 2:1.

22. The rubber tire of claim 18 wherein the coupling agent is a mercaptoalkylated poly(alkyleneimine).

23. The rubber tire of claim 18 wherein the coupling agent is mercaptoethylated polyethyleneimine and the rubber polymer is styrene-butadiene rubber.

* * * * *